United States Patent
Hasegawa

[11] Patent Number: 6,018,508
[45] Date of Patent: Jan. 25, 2000

[54] INTENSITY OF A LIGHT BEAM CHANGED ACCORDING TO THE LENGTH OF A MARK

[75] Inventor: Hiroshi Hasegawa, Yokosuka, Japan

[73] Assignee: Kabushiki Kaisha Toshiba, Kawasaki, Japan

[21] Appl. No.: 08/938,997

[22] Filed: Sep. 26, 1997

[30] Foreign Application Priority Data

Sep. 27, 1996 [JP] Japan ..................................... 8-256728

[51] Int. Cl.[7] ....................................................... G11B 5/00
[52] U.S. Cl. ......................... 369/124; 369/116; 369/275.2
[58] Field of Search .............................. 369/124, 47, 116, 369/100, 59, 275.2, 107.13, 54

[56] References Cited

U.S. PATENT DOCUMENTS

| | | | |
|---|---|---|---|
| 5,367,514 | 11/1994 | Kobayashi et al. | 369/116 |
| 5,396,480 | 3/1995 | Morishita et al. | 369/116 |
| 5,608,710 | 3/1997 | Minemura et al. | 369/116 |
| 5,673,249 | 9/1997 | Hasegawa et al. | 369/116 |
| 5,732,061 | 3/1998 | Kirino et al. | 369/116 |
| 5,745,467 | 4/1998 | Sakaue et al. | 369/116 |

FOREIGN PATENT DOCUMENTS

| | | |
|---|---|---|
| 7-129959 | 5/1995 | Japan . |
| 7-225947 | 8/1995 | Japan . |

*Primary Examiner*—John W. Cabeca
*Assistant Examiner*—Kim-Kwok Chu
*Attorney, Agent, or Firm*—Pillsbury Madison & Sutro LLP

[57] ABSTRACT

The present invention discloses an optical information recording method where a mark is formed on a recording medium by irradiating a light beam on the recording medium as pulses and recorded information is represented by the positions of the starting end and the finishing end of the mark, wherein the intensity of the light beam is changed according to the length of the mark and/or the pulse width of the light beam is reduced at least for the difference between the length of a mark to be formed and the length of a standard mark when the mark to be formed is shorter than the standard mark.

39 Claims, 11 Drawing Sheets

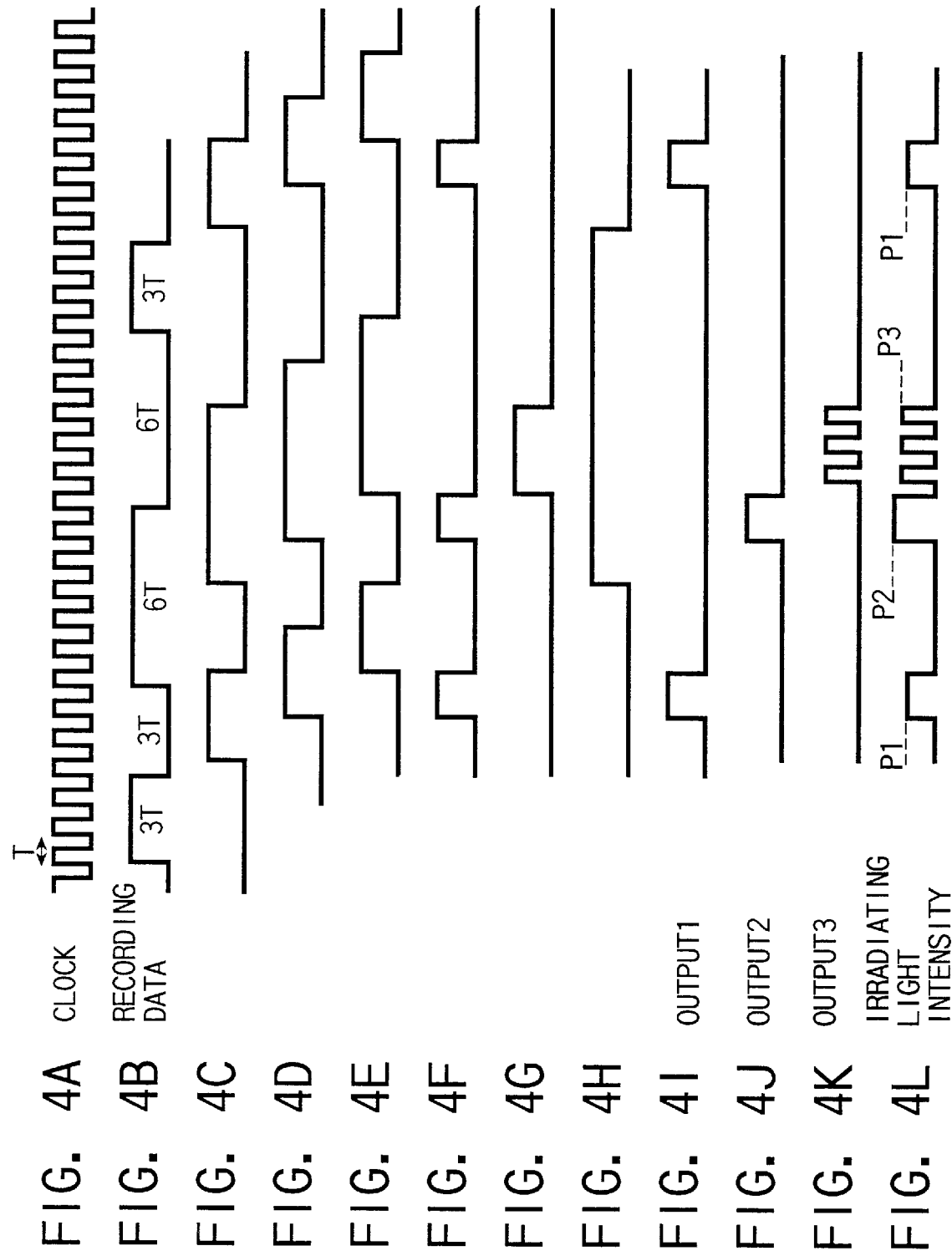

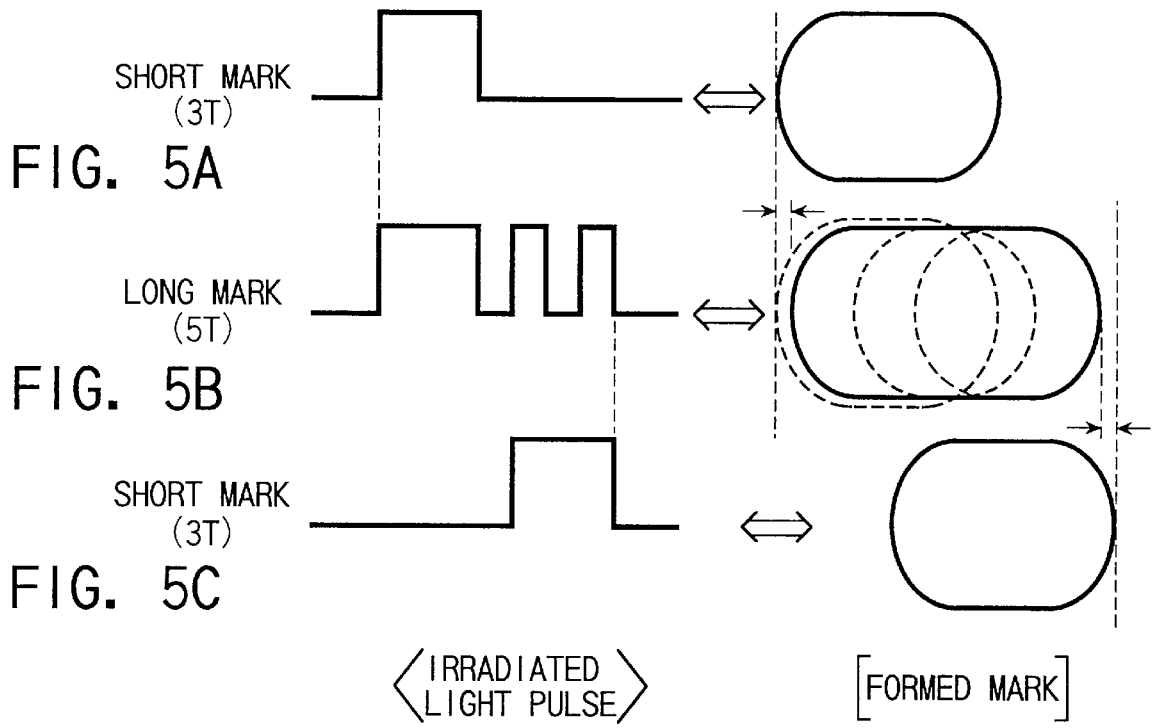
FIG. 5A
FIG. 5B
FIG. 5C
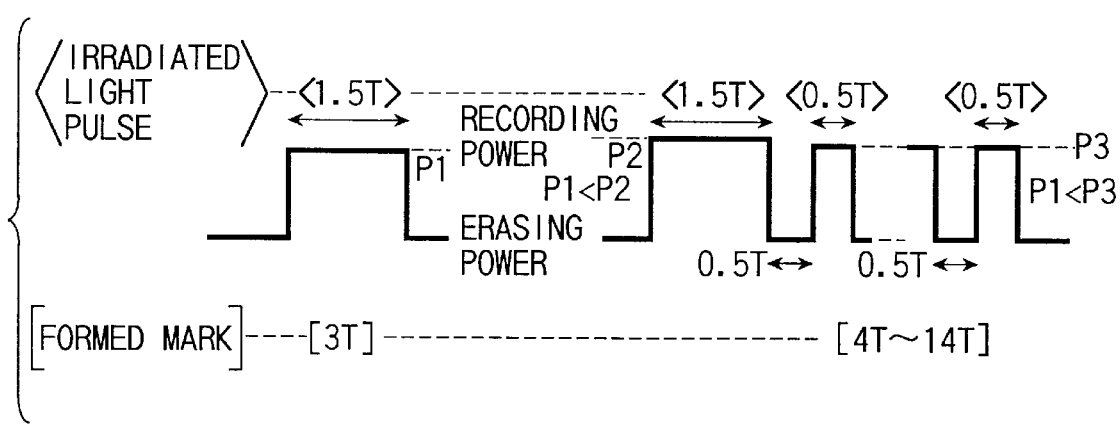
FIG. 6

| | RECORDING PULSE | | JITTER (%) | |
|---|---|---|---|---|
| | 3T | 4T ~ 14T | STARTING END | FINISHING END |
| (a) COMPENSATED | P1 12mW | P2 12.6mW  P3 12.6mW | 7.8 | 7.2 |
| (b) UNCOMPENSATED | 12mW | 12mW | 10.4 | 9.2 |

FIG. 7

| | RECORDING PULSE | | JITTER (%) | |
|---|---|---|---|---|
| | 3T | 4T ~ 14T | STARTING END | FINISHING END |
| (a) COMPENSATED | τ1 T/8  τ2 0  1.5T | 1.5T | 7.8 | 7.2 |
| (b) UNCOMPENSATED | 0 | 0 | 9.0 | 7.6 |

FIG. 11

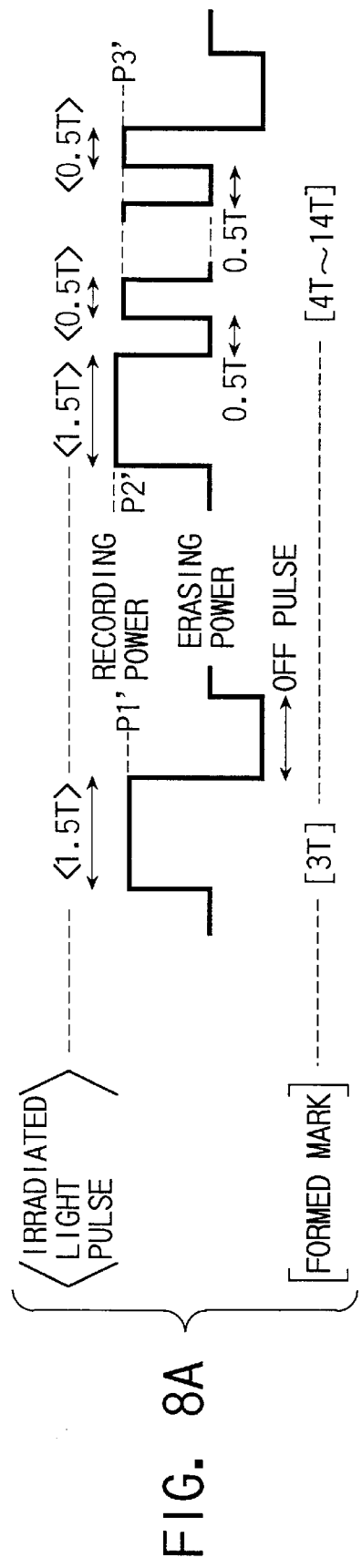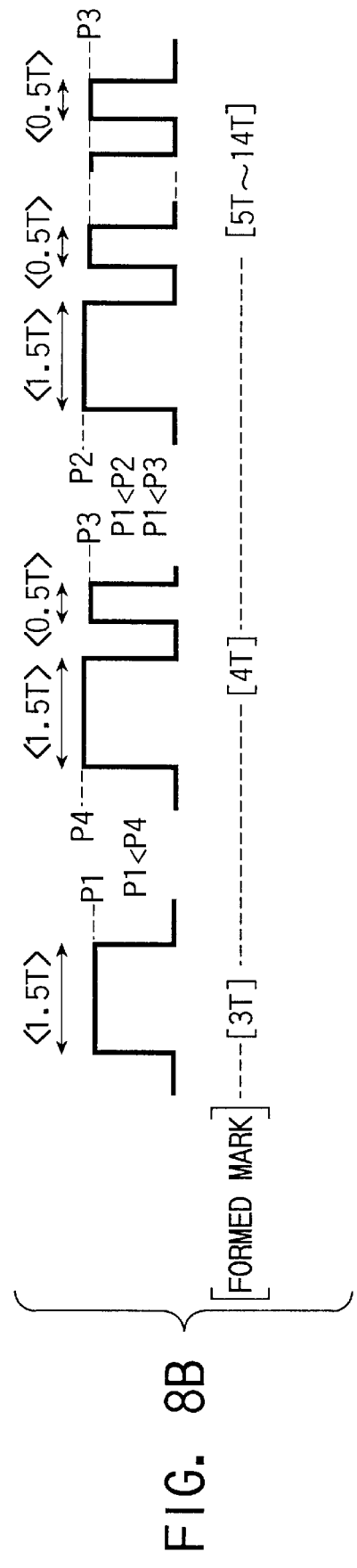

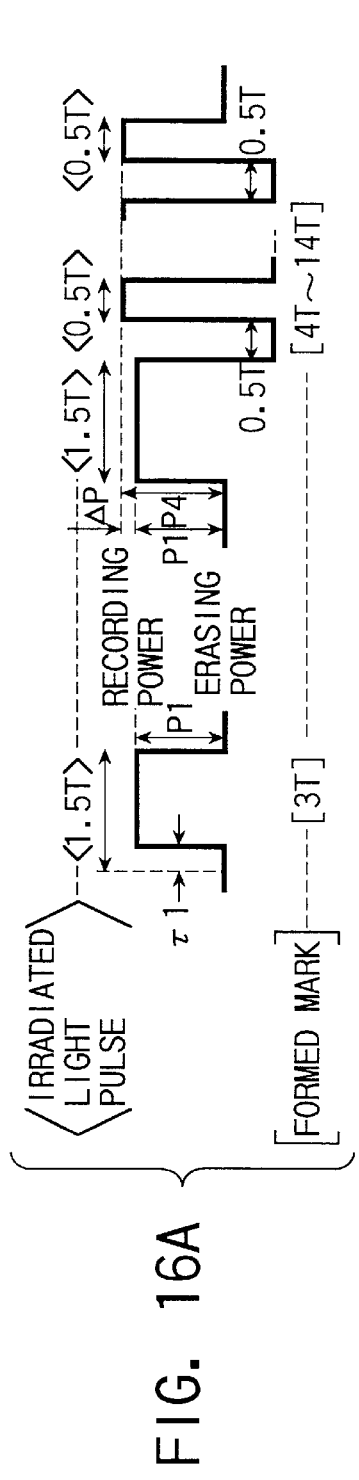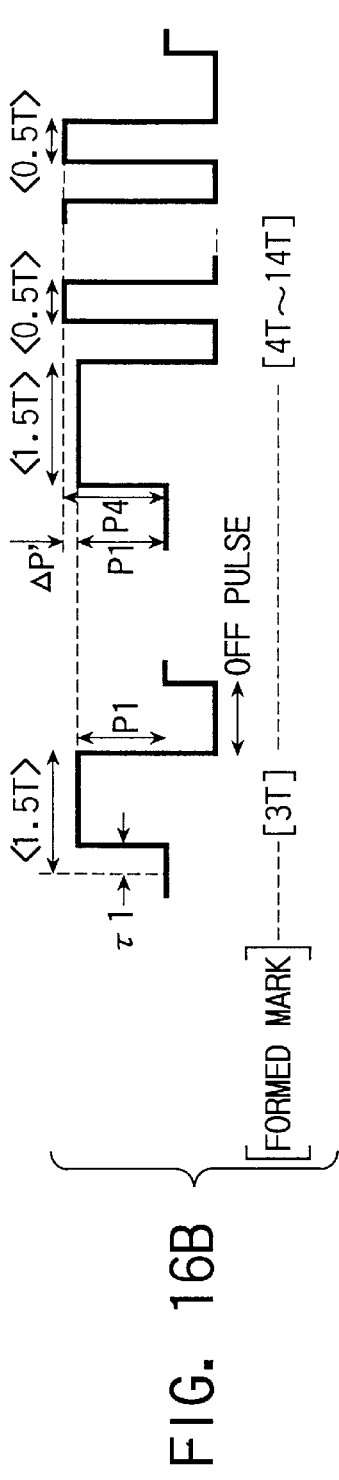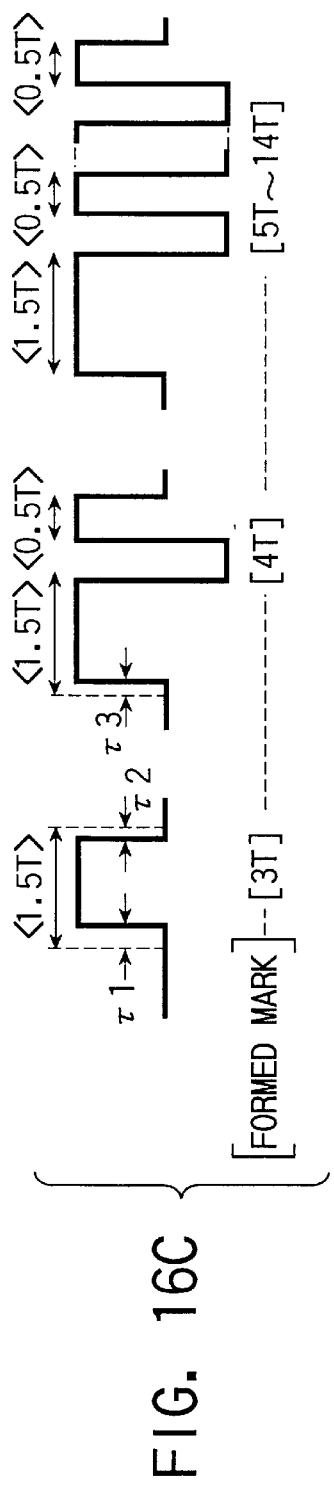

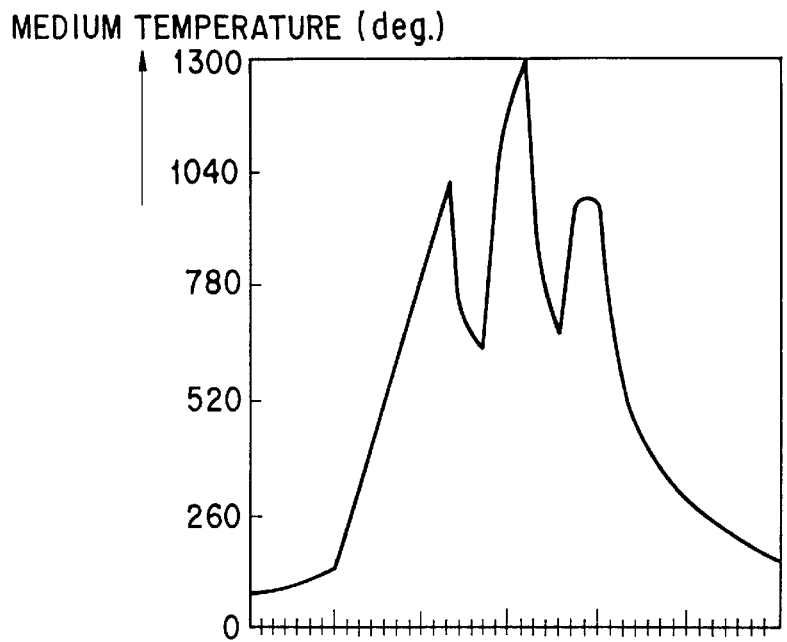
F I G. 17A
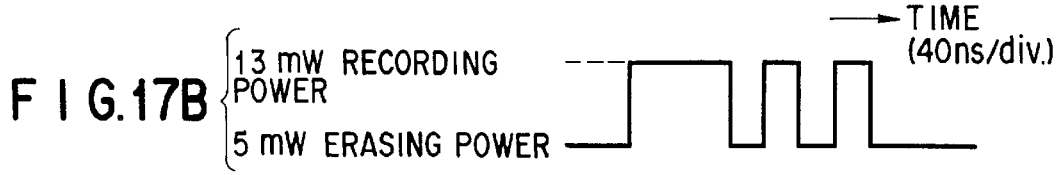
F I G. 17B { 13 mW RECORDING POWER / 5 mW ERASING POWER
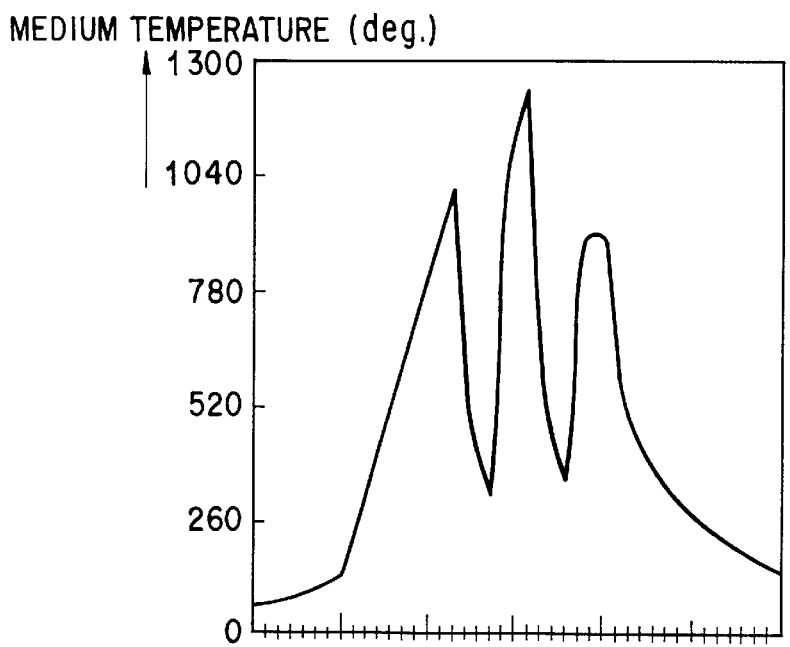
F I G. 18A
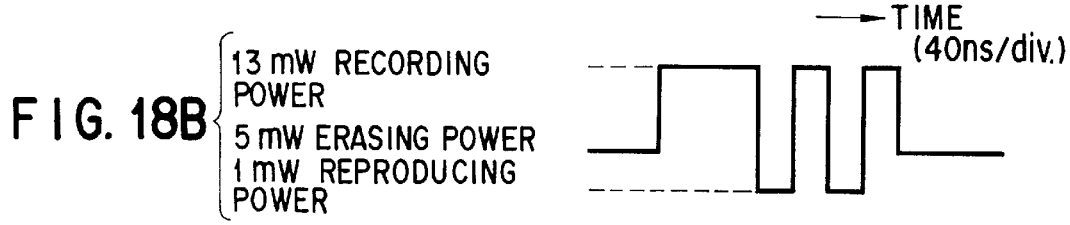
F I G. 18B { 13 mW RECORDING POWER / 5 mW ERASING POWER / 1 mW REPRODUCING POWER

INTENSITY OF A LIGHT BEAM CHANGED ACCORDING TO THE LENGTH OF A MARK

BACKGROUND OF THE INVENTION

The present invention relates to an optical information recording method for recording information by forming marks on a recording medium by irradiating a light, and a device thereof.

Various kinds of optical recording media for recording by forming optically identifiable marks by heat generated by irradiating a light (light beam) on a recording medium are discussed. One of the optical recording media is a phase-change type medium for recording by utilizing the thermal phase change between the crystalline and the amorphous. A recording film of a phase-change type medium is crystalline in a stationary state, but a region irradiated with a light changes from the crystalline to the amorphous by cooling after heating and melting. According to the principle, information can be recorded by forming an amorphous portion as a mark. As a recording method of such a phase-change type medium effective in improving the recording density, a PWM (pulse width modulation) where the positions of the starting end and the finishing end of a mark correspond with the information to be recorded can be presented.

In general, when the PWM method is applied to a phase-change type optical disk, a multi-pulse recording is conducted so as to reduce the heat accumulation caused by the light irradiation. The multi-pulse recording is a method where a plurally of divided light pulses but not a single light pulse (light pulse beam) is used as the irradiating light for forming a long mark. An example of such a multi-pulse recording is shown in FIG. 1. FIG. 1 is an example of recording information with an 8/16 modulation code with a mark length of a discrete value from 3T to 14T with respect to a recording window with T.

As shown in FIG. 1, a short mark of 3T, which is the shortest, is recorded with a single pulse of 1.5T. However, a long mark of 4T or more is recorded with a head pulse of 1.5T and sets of an erasing power period of 0.5T and a recording power period of 0.5T repeatedly for the length longer than 3T. That is, in the case of a long mark over 4T, subsequent pulses of 0.5T is added to a head pulse of 1.5T. For example, as shown in the right side of FIG. 1, in recording a mark of 6T, a set of an erasing power period of 0.5T and a recording power period of 0.5T are provided three times after a pulse of 1.5T. These light pulses may be generated synchronously with a recording clock.

However, even such a multi-pulse recording involves a problem in that positions of the starting end and the finishing end of a mark actually formed change from a predetermined position, depending upon the length of the mark. That is, as is later explained in detail, if the light irradiation is started with the same timing in the formation of both a short mark and a long mark, the heating conditions of the both are the same until the end of the head pulse irradiation. In the case of forming a short mark, utilizing only the head pulse, the heated and melted domain of a medium is cooled down to become amorphous. On the other hand, in the case of forming a long mark, utilizing the multi-pulse recording, the starting end position of the mark is shifted in the direction such that the mark length is shortened. The cause of the shift is attributed to the accelerated re-crystallization in the vicinity of the amorphous region since the region heated and melted by the head pulse is heated by the subsequent pulses again.

In the case the light irradiation is finished with the same timing in the formation of both a short mark and a long mark, the temperature distributions thereof after finishing the light irradiation are not always the same due to the heat characteristics of the medium. The medium temperature immediately after heating by the subsequent pulses is lower than the medium temperature immediately after heating by the head pulse. Therefore, as a consequence of a smaller molten domain after finishing the light irradiation, the finishing end position of a long mark is also shifted in the direction such that the mark length is shortened.

Accordingly, the starting end position and the finishing end position of a long mark are shifted in the direction such that the mark length is shortened more than the starting end position and the finishing end position of a short mark. In order to avoid the shift of the starting end position and the finishing end position of a mark depending upon the length of the mark so as to form a mark accurately, a recording compensation is needed. As a method of the recording compensation, a method of forming a mark with the head and tail positions of the irradiated light pulse preliminarily moved according to the length of a mark to be formed is disclosed in Japanese Patent Application Laid-Open (JP-A) No. 7-129959.

However, in the recording compensation method, a light pulse needs to be generated with change from a clock synchronization state, besides, the amount of the change needs to be adjusted depending upon the mark length. Since a complicated circuit such as a programmable delay line is necessary for that, it involves a problem of difficulty in achieving both accuracy and cost efficiency.

As mentioned above, in the conventional recording compensation method where a mark is formed with the head and tail positions of the irradiated light pulse preliminarily moved according to the length of a mark to be formed, since a light pulse needs to be generated with change from a clock synchronization state, besides, the amount of the change needs to be adjusted depending upon the mark length, it involves problems such as necessity of a complicated circuit and difficulty in achieving both accuracy and cost efficiency.

An object of the present invention is to provide an optical information recording method and apparatus including recording compensation capability for improving the accuracy of marks to be formed without a drastic cost increase, and a device thereof.

BRIEF SUMMARY OF THE INVENTION

The above-mentioned object is achieved by an optical information recording method where a mark is formed on a recording medium by irradiating a light beam on the recording medium as pulses and recorded information is represented by the positions of the starting end and the finishing end of the mark, wherein the intensity of the light beam is changed according to the length of the mark.

The above-mentioned object can be achieved also by an optical information recording method where a mark is formed on a recording medium by irradiating a light beam on the recording medium as pulses and recorded information is represented by the positions of the starting end and the finishing end of the mark, wherein the pulse width of the light beam is reduced for a width value more than the decrement of the light pulse width corresponding to the difference between the length of a mark to be formed and the length of a standard mark when the mark to be formed is shorter than the standard mark.

The above-mentioned object can be achieved also by an optical information recording method where a mark is formed on a recording medium by irradiating a light beam on the recording medium as pulses and recorded information is represented by the positions of the starting end and the finishing end of the mark, wherein the intensity of the light beam is changed according to the length of the mark, and the pulse width of the light beam is reduced for a width value more than the decrement of the light pulse width corresponding to the difference between the length of a mark to be formed and the length of a standard mark when the mark to be formed is shorter than the standard mark.

The above-mentioned object can be achieved by an optical information recording device, comprising an irradiating means for irradiating a light beam for forming a mark on a recording medium, and a light intensity controlling means having a means for changing the intensity of the light beam according to the mark length, for controlling the light intensity of the light beam of the irradiating means.

The above-mentioned object can be achieved also by an optical information recording device, comprising an irradiating means for irradiating a light beam for forming a mark on a recording medium, and a light intensity controlling means having a means for reducing the pulse width of the light beam at least for the difference between the length of a mark to be formed and the length of a standard mark when the mark to be formed is shorter than the standard mark, for controlling the light intensity of the light beam of the irradiating means.

The above-mentioned object can be achieved also by an optical information recording device, comprising an irradiating means for irradiating a light beam for forming a mark on a recording medium, and a light intensity controlling means having a means for changing the intensity of the light beam according to the mark length and reducing the pulse width of the light beam at least for the difference between the length of a mark to be formed and the length of a standard mark when the mark to be formed is shorter than the standard mark, for controlling the light intensity of the light beam of the irradiating means.

According to the present invention, the shift of the starting end position and the finishing end position of a mark can be alleviated by lowering the intensity of the irradiated light (such as a single pulse) for forming a short mark than the intensity of the irradiated light (such as a multi-pulse) for forming a long mark depending upon the mark length to be formed, by shortening the pulse width of the irradiated light for forming a short mark than the pulse width of the irradiated light at least for forming a long mark for the difference between the length of the short mark and the length of the long mark, or by changing both the intensity and the pulse width of the irradiated light depending upon the mark length.

As mentioned above, unlike the conventional recording compensation method where a mark is formed with the head and tail positions of the irradiated light pulse preliminarily moved according to the length of a mark to be formed, which requires a light pulse to be generated with change from a clock synchronization state, besides, the amount of the change to be adjusted depending upon the mark length, a complicated circuit such as a programmable delay line is not required, and the above-mentioned recording compensation can be realized by utilizing an intensity switching function originally provided in the power controller of the optical disk device, or by conducting a simple pulse width adjusting operation. Accordingly, without a drastic cost increase, a high information recording reliability can be achieved by improving the accuracy of a mark to be formed.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A to 4L are waveform illustrations for explaining the operation of the power controller.

FIGS. 5A to 5C are diagrams for explaining the change of the starting and finishing end positions of a mark according to the length of the mark.

FIG. 6 is a diagram for explaining an irradiated light pulse in the first embodiment.

FIG. 7 is a table showing the experiment results for confirming the recording compensation effect by the light intensity of the irradiated light pulse in the first embodiment.

FIGS. 8A to 8B are diagrams for explaining other irradiated light pulses in the first embodiment.

FIG. 11 is a table showing the experiment results for confirming the recording compensation effect by the light intensity of the irradiated light pulse in the second embodiment.

FIGS. 16A to 16C are diagrams for explaining other irradiated light pulses in the third embodiment.

FIGS. 17A to 17B are diagrams showing the simulation results of a medium temperature hysteresis in the multi-pulse recording in the case the multi-pulse bottom power is equal to the erasing power.

FIGS. 18A to 18B are diagrams showing the simulation results of a medium temperature hysteresis in the multi-pulse recording in the case the multi-pulse bottom power is equal to the reproducing power.

DETAILED DESCRIPTION OF THE INVENTION

Hereinafter embodiments of the present invention will be described. The present invention discloses an irradiated light intensity compensation method and/or a light pulse width compensation method as a recording compensation method for forming a highly accurate mark by avoiding the shift of the starting end position and the finishing end position of a mark depending on the length of the mark. The irradiated light intensity compensation method is a method of changing the intensity of a light beam according to the length of the mark. And the light pulse width compensation method is a method of reducing the pulse width of a light beam for a width value more than the decrement of the light pulse width corresponding to the difference between the length a mark to be formed and the length of a standard mark when the mark to be formed is shorter than a standard mark.

(First Embodiment)

Figure 2:
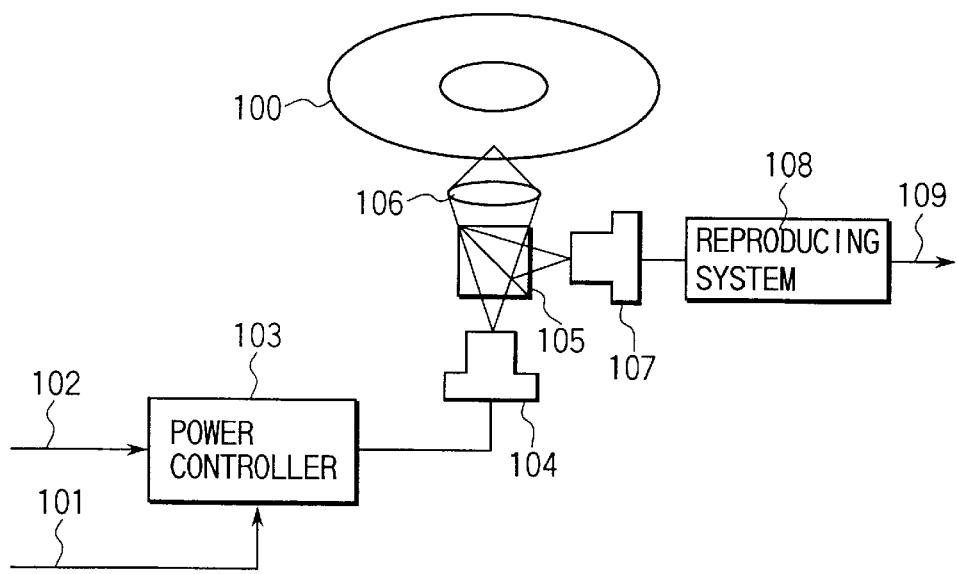
FIG. 2 is a diagram showing the configuration of a first embodiment of an optical disk device of the present invention.

FIG. 2 shows the configuration of an optical disk device according to the first embodiment of the present invention. This embodiment is a recording compensation method of changing the irradiated light (light beam) intensity according to the length of the mark for alleviating the shift of the starting end position and the finishing end position of a mark depending on the length of the mark. As a recording medium, for example, an optical disk 100 having a phase-change type recording film, capable of rewriting can be used.

In recording, a recording clock 101 and recording data 102 synchronous thereto are inputted to a power controller 103. The power controller controls a light source 104 (such as a semiconductor laser element) according to the recording data 102 such that a light having a pattern and an intensity corresponding to the recording data 102 is outputted from the light source 104. The light outputted from the light source is incident on an object lens 106 via a beam splitter 105 and is directed onto the optical disk 100 as a minute spot. Accordingly, a mark comprising an amorphous portion according to the recording data 102 is formed on the optical disk 100. In this case, the positions of the starting end and the finishing end of the mark represent the recorded information.

On the other hand, in reproduction, a reflected light from the optical disk 100 returns via the object lens 106 in the direction opposite to the irradiated light in recording to be incident on a light receiver 107 via the beam splitter 105 so that the amount of the reflected light is detected. That is, a reproduced signal 109 corresponding to the recorded information can be obtained by the mark formed on the optical disk 100 being detected by the change of the amount of the reflected light and a signal corresponding to the amount of the reflected light being processed via a reproducing system 108.

Figure 3:
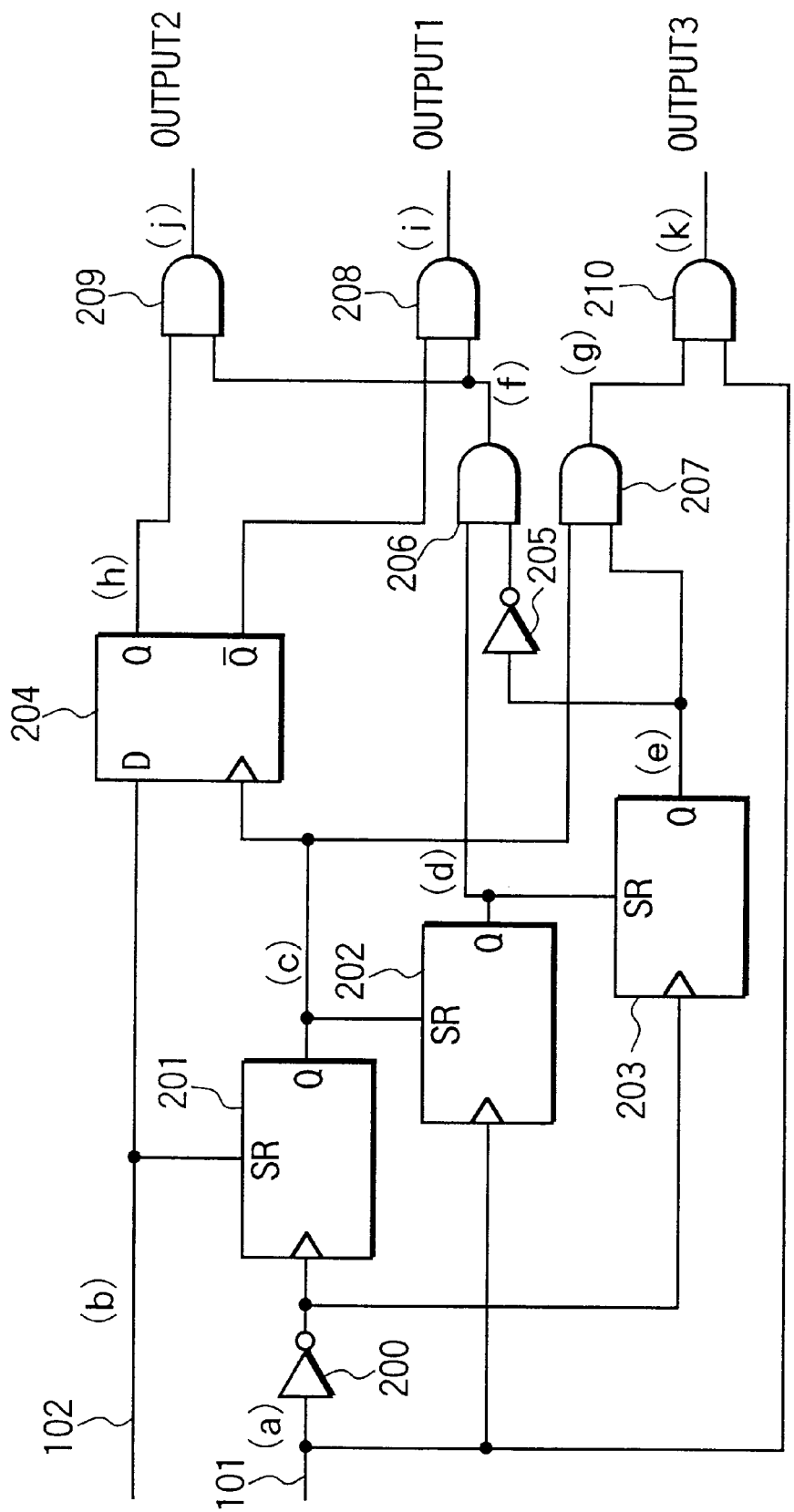
FIG. 3 is a diagram showing the configuration of a power controller of the first embodiment.

The power controller 103 characteristic of this embodiment will be explained in detail. FIG. 3 shows an example of the configuration of the power controller 103 and FIGS. 4A to 4L show the operation waveforms of each portion. The recording clock 101 of FIG. 4A is inputted to three shift registers 201 to 203 with the recording data 102 of FIG. 4B directly or via an inverter 200 to be delayed by 3.5T, 5T, and 6.5T, respectively as shown in FIGS. 4C, 4D, 4E. The recording data 102 here are an 8/16 modulation code with the range of a high level period and a low level period limited, and the minimum period of each level is 3T. Based on the delay signals shown in FIGS. 4C, 4D, 4E, signals shown in FIGS. 4F, 4G, 4H are generated in the digital arithmetic circuit comprising a flip flop 204, an inverter 205, and AND gates 206 to 210. And based on the signals, outputs 1, 2, 3 shown in FIGS. 4I, 4J, 4K are generated as the output of the power controller 103.

The outputs 1 to 3 correspond with the high level period of the recording data 102. The output 1 outputs a pulse of 1.5T width when the period is 3T, corresponding to the shortest mark. The output 2 outputs a pulse of 1.5T width when the period is 4T or more. When the period is lower than 4T, the output 3 outputs a pulse of 0.5T width each for 1T of the period longer than 3T. The outputs 1 to 3 correspond with a set irradiated light intensity so that the optical disk 100 is irradiated with a light of an intensity P1 in the period of the output 1, with a light of an intensity P2 in the period of the output 2, and with a light of an intensity P3 in the period of the output 3.

As shown in FIG. 4L, when the high level period of the recording data 102 is 3T, a mark of a 3T length is formed by irradiating a light of the intensity P1 for the 1.5T period. When the high level period of the recording data 102 is 4T or more, a mark of a desired length is recorded by irradiating a light of the intensity P2 for the 1.5 period.

The positions of the starting end and the finishing end of the mark recorded as mentioned above are determined independently according to the recording data 102. Therefore, if the starting end position and the finishing end position of the mark change depending on the physical relationship with each other, that is, the length of the mark or the length of the interval between marks, information cannot be recorded accurately.

In this embodiment, by changing the intensities P1, P2, P3 of the irradiated light according to the mark length as mentioned below, recording compensation is conducted for compensating the shift of the starting end position and the finishing end position of a mark depending on the length of the mark.

Figure 1:
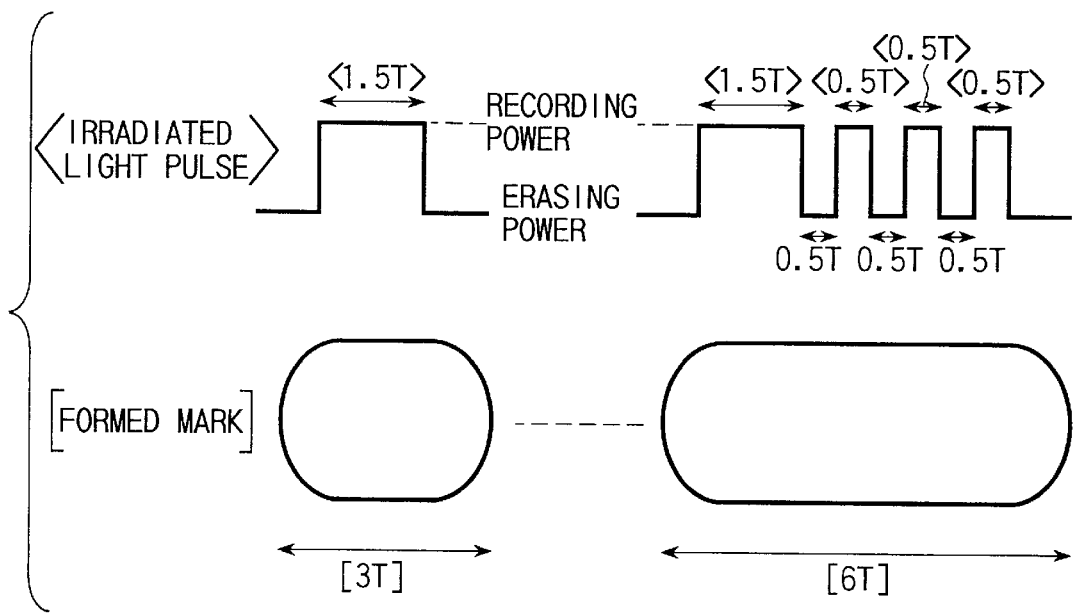
FIG. 1 is a diagram for explaining an irradiated light pulse based on the conventional technology.

The multi-pulse recording of FIG. 1 described as the conventional technology corresponds with the case of having the irradiated light intensities P1, P2, P3 in FIGS. 4A to 4L equal. FIGS. 5A to 5C show the case the starting end position or the finishing end position of the mark to be formed changes depending on the length of the mark even if the timing of starting or finishing irradiation of a light pulse is the same, with P1=P2=P3.

In recording the short mark (mark length 3T, which is the shortest in this example) in FIG. 5A and the long mark (mark length 5T) in FIG. 5B, respectively, by starting light irradiation with the same timing, the heating conditions are the same until finishing the head light pulse irradiation of 1.5T width. Since the case of FIG. 5A has only the head pulse, the heated and melted domain on the optical disk 100 is cooled down to be amorphous and form a mark. On the other hand, in the case of FIG. 5B, subsequent pulses are irradiated to the domain heated and melted by the head pulse during the cooling period so that it is slightly re-heated. Accordingly, in the region heated and melted by the head pulse in the case of FIG. 5B, re-crystallization of the vicinity of the amorphous domain is accelerated so that the starting end position of the mark is shifted in the direction such that the mark length is shortened.

On the other hand, in recording the short mark (mark length 3T) of FIG. 5C and the long mark (mark length 5T) of FIG. 5B, the temperature distributions at the time of finishing the light irradiation thereof are not always the same even if the light irradiation is finished with the same timing. It depends on the heat characteristics of a medium, and thus in the case of the medium of which heated domain is cooled down comparatively rapidly, the medium temperature immediately after heating by the subsequent pulses of a 0.5T width of FIG. 5B is lower than the medium temperature immediately after heating by the head pulse of a 1.5T width of FIG. 5C. Accordingly, since the case of FIG. 5B has a molten domain at the time of finishing the light irradiation smaller than that of the case of FIG. 5C, the finishing end position of an amorphous mark formed after cooling is shifted in the direction such that the mark length is shortened.

That is, in forming a short mark, both the starting end position and the finishing end position of the mark are shifted in the direction such that the mark length is elongated compared with the starting end position and the finishing end position of a long mark formed by starting or finishing the light irradiation with the same timing.

In order to compensate the shift of the starting end position or the finishing end position of a mark depending on the length of a mark, a recording compensation method of changing the intensity of the irradiated light according to the length of the mark as mentioned below is adopted in this embodiment.

FIG. 6 shows the irradiated light pulse waveform adopted with a recording compensation by the irradiated light intensity control depending on the mark length based on this embodiment. As the following explanation is an example for, random data of 8/16 modulation code recorded on the medium by the PWM method. With the premise the irradiated light intensity of a pulse of a 1.5T width in recording a short mark of a mark length 3T is P1, the irradiated light intensity of a head pulse of a 1.5T width in recording a mark of a mark length of 4T to 14T is P2, and the irradiated light intensity of a multi-pulse of a 0.5T width is P3, the shift of the starting end position of the mark is alleviated by having P1<P2, and the shift of the finishing end position of the mark is alleviated by having P1<P3. Since the optimum compensation amount varies depending upon the medium characteristics, in some cases it is appropriate to set the compensation amounts of the starting end and the finishing end the same and have P2 and P3 the same, and in other cases it is appropriate to have P1 and P3 the same without compensating the finishing end.

FIG. 7 shows the experiment results for confirming the effects of recording compensation by the irradiated light intensity based on this embodiment. They are the results of measuring the jitter amounts between the starting ends and between the finishing ends in recording random data of an 8/16 modulation code in the recording density of 0.41 $\mu$m/bit on the optical disk 100 in the PWM method. Here the "jitter" denotes the difference from the original position of the starting end or the finishing end of the mark. A smaller jitter valve represents a higher recording reliability.

(b) of FIG. 7 is the case of recording with P1=P2=P3=12 mW without recording compensation. Since both the starting end position and the finishing end position of a mark are shifted depending on the length of the mark in the random data, the difference becomes large to deteriorate the jitter. On the other hand, (a) of FIG. 7 is the case of recording with P1=12 mW, P2=P3=12.6 mW with compensation of the shift of the starting end position and the finishing end position of a mark depending on the length of the mark by controlling the irradiated light intensity. Apparently, the jitter is improved both between the starting ends and between the finishing ends in (a) of FIG. 7 compared with (b) of FIG. 7 and thus the experiment results prove the effectiveness of the present invention.

In the recording compensation of the present invention, the three levels of irradiated light intensity P1, P2, P3 are switched according to the recording conditions (mark length) and the medium characteristics, but since the intensity switching function is provided in the power controller 103 of the optical disk device originally, only a circuit for judging the recording conditions including the medium characteristic needs to be added for conducting recording compensation of the present invention, and thus it does not lead to a drastic cost increase.

On the other hand, since the recording compensation method disclosed in Japanese Patent Application Laid-Open (JP-A) No. 7-129959 presented as the conventional technology requires preliminarily moving the positions of the head pulse and the tail pulse in the multi-pulse depending on the length of the mark to be recorded, not only the recording condition judging circuit, but also a complicated circuit such as a programmable delay line for moving the position of a pulse are needed.

Since the compensation method of this embodiment does not require such a complicated and expensive hardware, it permits achievement of both the accuracy and the cost efficiency.

FIGS. 8A and 8B show another embodiment of the irradiated light pulse adopted with a recording compensation by the irradiated light intensity control depending on the mark length. FIG. 8A differs from FIG. 6 in that the so-called "off-pulse" is added where the irradiated light intensity is lowered compared with the erasing power at the time of finishing the irradiation of the pulse of a 1.5T width in recording a short mark of a 3T mark length and at the time of finishing the irradiation of the multipulse of a 0.5T width following the head pulse of a 1.5T width in recording a mark of a mark length of 4T to 14T. The application of the off-pulse itself is already known, but the combination of the off-pulse and the recording compensation by the change of the irradiated light intensity according to the mark length in this embodiment is novel.

According to the study of the present inventors, effects of forcible interruption of heating the recording film and restraining the re-crystallization to enlarge the mark can be achieved by adding the off-pulse. At the mark finishing end side, the effects can be realized regardless of the length of a mark, however, at the mark starting end side, the effects can be realized only in a short mark and the shift of the mark starting end position by the length of the mark becomes larger than the case without adding the off-pulse. Accordingly, in the case of using the off-pulse in combination with the recording compensation by the change of the irradiated light intensity according to the mark length as in this embodiment, the intensity ratio of P2'/P1' with the premise that the irradiated light intensity of a pulse of a 1.5T width in recording a short mark of a mark length of 3T is P1', the irradiated light intensity of the head pulse of a 1.5T width in recording a mark of a mark length of 4T to 14T is P2', and the irradiated light intensity of a multi-pulse of a 0.5T width is p3' becomes larger than the intensity ratio P2/P1 necessary for the compensation in the case of FIG. 5. This is confirmed by the experiment.

On the other hand, FIG. 8B is an example of setting the irradiated light intensity of the head pulse in recording a mark of the second shortest mark length 4T of FIG. 6 at a fourth intensity P4, which is different from P2. Although it is not shown in the figure, the fourth intensity P4' different from P2' can be set in the case of adding the off-pulse. However, in order to realize this, the power controller 103 needs to comprise a circuit for distinguishing a 4T mark and a function concerning the intensity setting. By increasing the compensation conditions as mentioned above, although the improvement of the recording performance can be expected, it leads to the cost increase by the complication of the device and thus it is preferable to determine the number of the compensation conditions in consideration of the required performance and the allowed cost range.

In FIG. 8B, the off-pulse can be added as in FIG. 8A.
(Second Embodiment)

The second embodiment of the resent invention will be explained with reference to FIGS. 9 to 12. This embodiment is a recording compensation method of changing the pulse width of the irradiated light (light beam) depending on the length of a mark for alleviating the shift of the starting end position and the finishing end position of the mark depending on the length of the mark.

Figure 9:
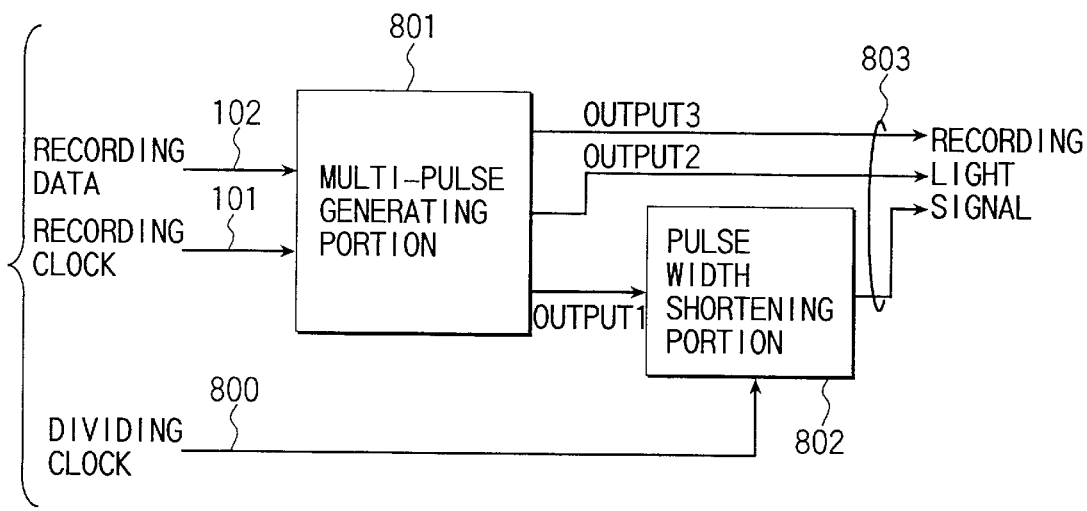
FIG. 9 is a diagram showing the configuration of a power controller of a second embodiment.

FIG. 9 shows the configuration of a power controller of this embodiment. A recording clock 101 and recording data 102 synchronous thereto are inputted to a multi-pulse generating portion 801 so that a multi-pulse following a certain rule is formed. With the multi-pulse formation rule as in the first embodiment, three outputs 1, 2, 3 corresponding to the high level period of the recording data 102 are outputted from the multi-pulse generating portion 801 as in FIG. 4. As the following explanation is an example for, random data of ⁸⁄₁₆ modulation code recorded on the medium by the PWM method.

Among the outputs, 1, 2, 3, the output 1 for outputting a pulse of a 1.5T width in recording the shortest 3T mark is inputted to a pulse width shortening portion 802. By being synthesized with the other outputs 2 and 3 after having the pulse width shortened here, a recording light signal 803 is produced. The amount of shortening the pulse width in the pulse width shortening portion 802 is designated by a dividing clock 800. As in the case of FIG. 2, the recording light signal 803 is supplied to the light source 104 (such as a semiconductor laser) so that the irradiated light pulse is produced.

Figure 10:
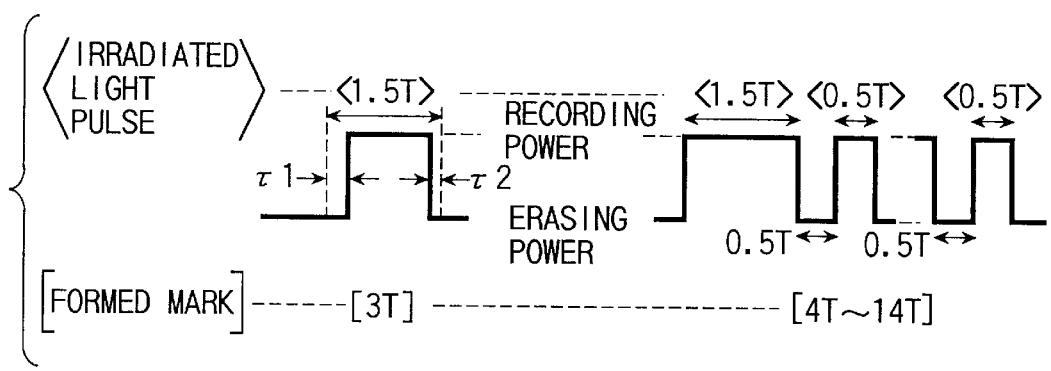
FIG. 10 is a diagram for explaining an irradiated light pulse in the second embodiment.

FIG. 10 shows an example of an irradiated light pulse adopted with the recording compensation by the pulse width control based on this embodiment. With respect to the irradiated light pulse of the conventional technology in FIG. 1, the pulse width is shortened by predetermined amounts $\tau 1$ and $\tau 2$ from the front edge side and the rear edge side of the pulse respectively so that the pulse width is shorter than 1.5T at the time of forming a short mark (mark length 3T).

As explained with reference to FIG. 5, in the case of recording a short mark (for example, mark length of 3T) by the irradiated light pulse of FIG. 11, both the starting end position and the finishing end position of a mark tend to shift in the direction to expand compared with the starting end position and the finishing end position in the case of recording a long mark (for example, mark length of 5T) with the same time of starting or finishing the irradiation. Therefore, in order to compensate for the shift of the starting end position and the finishing end position of a mark depending on the length of the mark, a method of shortening the pulse width from the front edge side and the rear edge side of the irradiated light pulse in recording a short mark is effective. Of course a certain compensation effect can be expected only by shortening the pulse width from either of the front edge side or the rear edge side.

According to the study of the present inventors, in a high recording density, the compensation effect is large particularly in the case of shortening the pulse width from the front edge side of the pulse, that is, by $\tau 1$ of FIG. 10. $\tau 1$ ($\tau 2=0$) alone can mainly compensate for the shift of the starting end position, but as a result of the temperature decrease at the time of finishing the irradiation by shortening the pulse width, a slight reducing effect is confirmed also with respect to the shift of the finishing end position.

FIG. 11 shows the experiment results conducted for confirming the effects of recording compensation by the pulse width based on this embodiment. Although the medium characteristics are slightly different from the experiment of FIG. 7, they also are the results of measuring the jitter amounts between the starting ends and between the finishing ends in recording random data of an ⁸⁄₁₆ modulation code in the recording density of 0.41 $\mu$m/bit on the optical disk 100 in the PWM method.

(b) of FIG. 11 is the case of recording with $\tau 1=\tau 2=0$ without recording compensation, and (a) of FIG. 11 is the case of recording with $\tau 1=T/8$, $\tau 2=0$ with compensation by shortening the pulse width only from the front edge side of the pulse. In the noncompensated recording of FIG. 11(b), the starting end jitter is drastically worse than the finishing end jitter. In the compensated recording of FIG. 11(a), the starting end jitter is dramatically improved and the finishing end jitter is slightly improved compared with FIG. 11(b), and thus the result prove the effectiveness of this embodiment.

In the recording compensation method of this embodiment where the pulse width is shortened from either or both of the front edge side and the rear edge side of the irradiated light pulse in recording a short mark, since the dividing clock 800, which divides the recording clock 101 can be used for designating the amount of shortening, it does not lead to a large cost increase. Therefore, the recording compensation method of this embodiment can easily achieve both the accuracy and the cost efficiency.

Figure 12A:
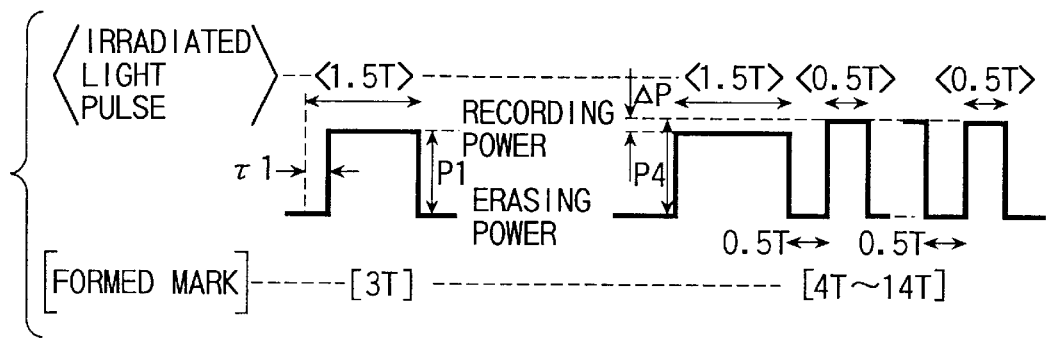
FIGS. 12A to 12C are diagrams for explaining other irradiated light pulses in the second embodiment.
Figure 12B:
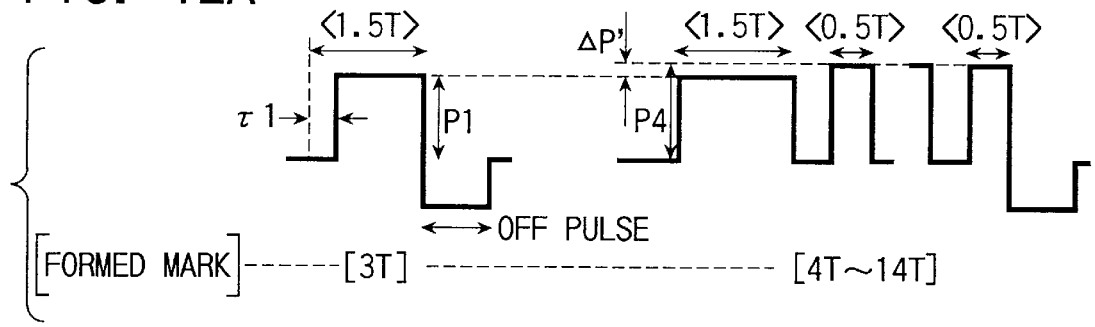
Figure 12C:
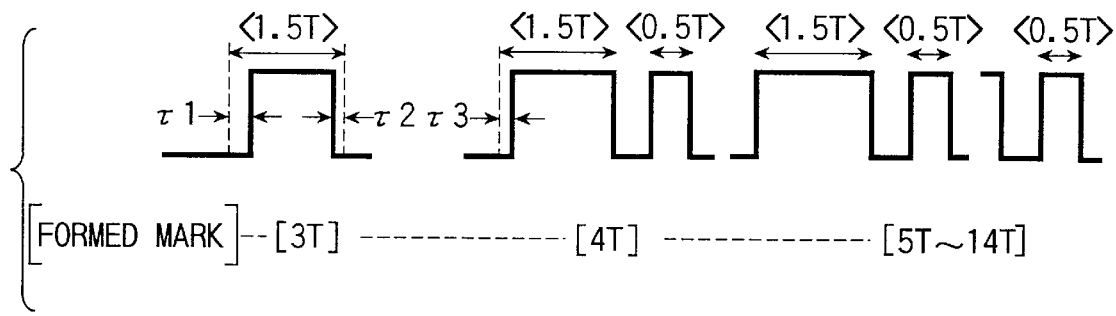
Figure 13:
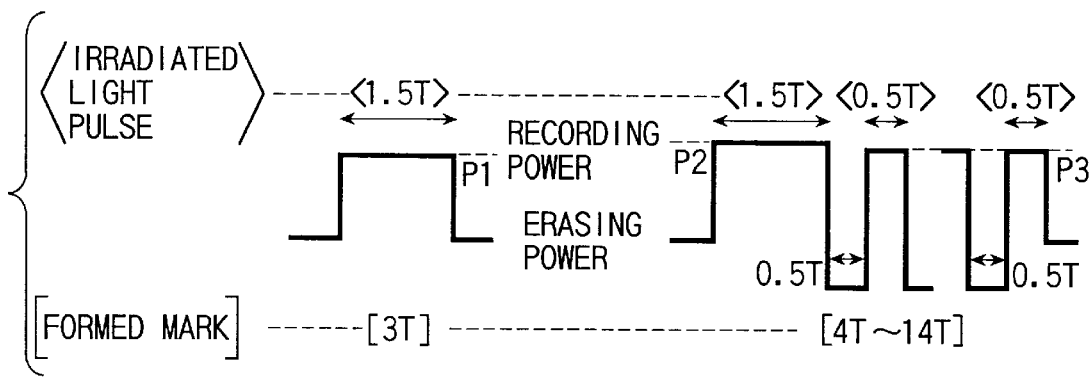
FIG. 13 is a diagram for explaining an irradiated light pulse in a third embodiment.

FIGS. 12A to 12C shows another example of the irradiated light pulse adopted with the recording compensation by the pulse width control based on this embodiment.

FIG. 12A is a method of compensating the shift of the finishing end position of a mark by having the intensity of the wave of subsequent pulses in the multi-pulse by $\Delta$ P than the head pulse in place of shortening the pulse width from the rear edge side of the irradiated light pulse in recording a short mark (e.g. mark length 3T). FIG. 12B is an example of further adding the "off-pulse" to FIG. 12A.

In the method of shortening the pulse width also from the rear edge side of the pulse shown in FIG. 10 ($\tau 2>0$), a function of having both starting and finishing the off-pulse earlier relatively by $\tau 2$ in recording a short mark needs to be provided in order to add the same off-pulse to both a long mark and a short mark. On the other hand, according to the method of recording compensation b the combination of the irradiated light pulse width and the control on the light intensity as shown in FIG. 12B, since the off-pulse can be added with the same timing regardless of the length of the mark, such a timing adjustment is not necessary so that the complication of a circuit can be avoided.

FIG. 12C is an example of recording compensation by shortening the pulse width also in recording the second shortest 4T mark by $\tau 3$ from the front edge side in addition to the compensation of $\tau 1, \tau 2$ in recording the shortest mark (e.g. mark length 3T) shown in FIG. 9. As in the first embodiment, the increase of the compensation conditions contributes to the improvement of the recording performance, but on the other hand, it leads to the cost increase by the complication of the device. Therefore it is preferable to determine the number of the compensation conditions inn consideration of the required performance and the allowed cost range.

In FIG. 12C, the off-pulse can be added as in FIG. 12B.

As heretofore mentioned, according to the second embodiment, in the normal case, a shortest mark is formed by a single light pulse, a mark having a length longer than the shortest mark is formed by a multi-pulse, and the pulse width of the multi-pulse is linear-changed in accordance with the mark length in the head and the tail light beam of the multi-pulse.

The other hand, according to the second embodiment is a method of changing the intensity of a light beam according to the length of the mark. And the light pulse width compensation method is a method of reducing the pulse width of a light beam for a width value more than the decrement of the light pulse width corresponding to the difference between the length a mark to be formed and the length of a standard mark when the mark to be formed in shorter than a standard mark, thereby achieves the mentioned advantages.

(Third Embodiment)

In the above-mentioned embodiments, as shown in FIGS. 6, 8, 10, 12, the intensity in the multi-pulse, that is, of the irradiated light (light beam) in the recording power irradiation pause period (bottom power) and the erasing power are the same.

On the other hand, the recording compensation method of this embodiment differs from the above-mentioned embodiments in that the bottom power, which is the irradiated light (light beam) intensity between pulses in the multi-pulse is lowered compared with the erasing power (irradiated light intensity necessary for erasing a mark) as shown in FIGS. 13 to 16. Here FIG. 13 corresponds with FIG. 6, FIGS. 14A, 14B correspond with FIGS. 8A, 8B, FIG. 15 corresponds with FIG. 10, and FIGS. 16A, 16B, 16C correspond with FIGS. 12A, 12B, 12C. In either case, the bottom power is lowered to the level of the off-pulse.

Figure 14A:
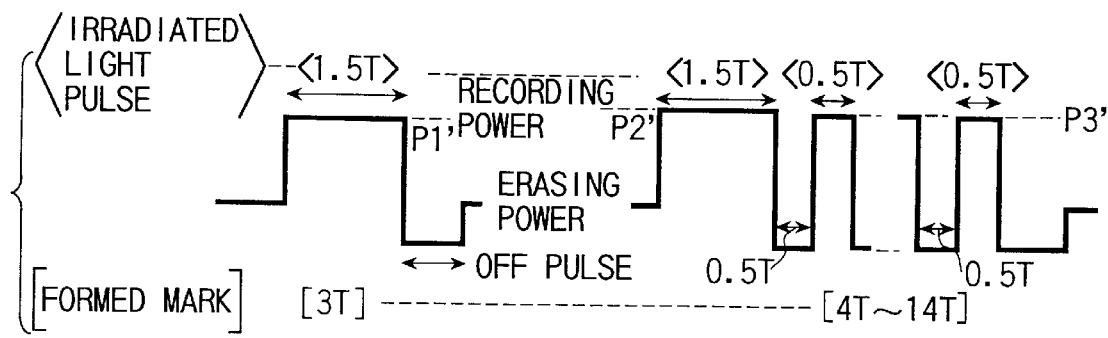
FIGS. 14A to 14B are diagrams for explaining other irradiated light pulses in the third embodiment.
Figure 14B:
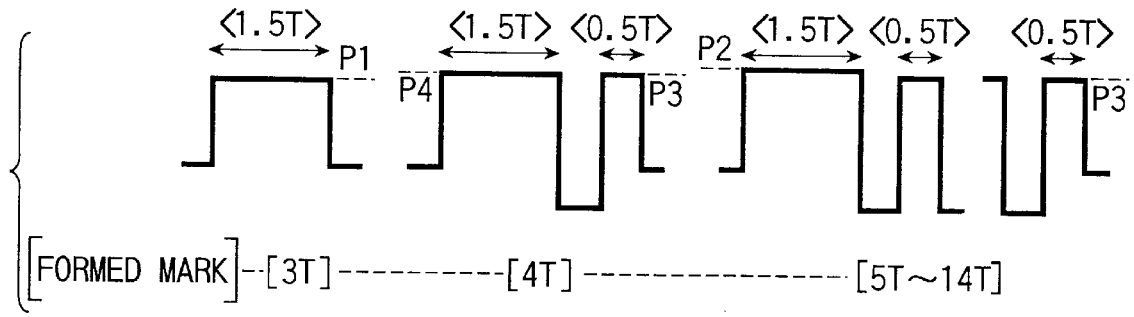
Figure 15:
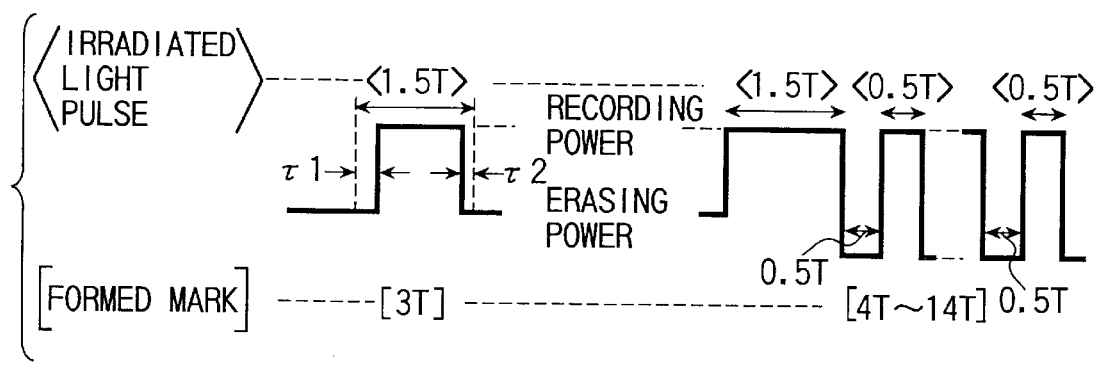
FIG. 15 is a diagram for explaining another irradiated light pulse in the third embodiment.

In FIGS. 14B, 16C, the off-pulse can be added as in FIGS. 14A, 16B.

By lowering the bottom power of the multi-pulse than the erasing power as mentioned above, the reliability of the information recording can be further increased. This effect will be explained with reference to FIGS. 17A, 17B, 18A, 18B.

FIGS. 17A, 17B, 18A, 18B show the results of simulation of the medium temperature hysteresis in irradiating the multi-pulse at a point in the center of the mark. FIGS. 17A and 17B are the case of having the bottom power equal to the erasing power. FIGS. 18A and 18B are the case of having the bottom power equal to the reproducing power, which is lower than the erasing power. Compared with the case of FIGS. 17A and 17B, inn the case of FIGS. 18A and 18B, the domain of the medium melted by irradiating the recording power is cooled down to a lower temperature o that the cooling speed is faster. That is, since the cooling speed becomes faster by having the bottom power lower than the erasing power, the mark, which is amorphous can be stably formedstably formed so that the reliability of the information recording can be further improved.

Although the bottom power is equal to the reproducing power here, the same effect can be obtained by having it lower than the erasing power. However, by having the bottom power equal to the reproducing power, equal to the off-pulse as in FIGS. 13 to 16, or equal to a non-emission power, the complication of the power controller can be avoided without increasing the number of the power level to be controlled as the irradiated light intensity.

For example, in the above-mentioned embodiments, as a method of compensating the shift of the starting end position and the finishing end position of a mark, a method of compensating by the control of the irradiated light intensity according to the mark length and the method of compensating by the control of the pulse width according to the mark length are explained, but a compensating method combining the both can be used as well.

Although the recording pulse (irradiated light pulse) is a multi-pulse with a fixed pattern and only the mark length is compensated in the above-mentioned embodiments, an irradiated light intensity compensation method depending on the mark length or an optical pulse width compensation method of the present invention can be applied to a rectangular pulse, a stepwise pulse, or a multi-pulse of another pattern. Further, it is also possible to further improve the recording reliability in a high density recording by the light intensity compensation or the light pulse width compensation in more stages in combination with the heat interference in recording or the waveform interference in reproducing depending on not only the mark length but the mark interval.

As heretofore mentioned, according to the present invention, a mark can be formed accurately without complicating the hardware configuration, avoiding the shift of the starting end position and the finishing end position of a mark depending on the length of the mark so that recording compensation can be conducted realizing both the accuracy and a low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. An optical information recording method comprising forming a mark on a recording medium by radiating a light beam on the recording medium in a form of a single pulse or a multi-pulse, the number of pulses of the multi-pulse being in accordance with a length of the mark, recorded information being represented by the positions of a starting end and a finishing end of the mark, wherein an intensity of the single pulse or a head pulse of the multi-pulse is in accordance with the length of the mark.

2. An optical information recording method according to claim 1, wherein a width of the single pulse is in accordance with a width of the mark.

3. An optical information recording method according to claim 2, wherein the light beam between the pulses of the multi-pulse has an intensity lower than the intensity necessary for erasing the mark.

4. An optical information recording method according to claim 1, wherein a light beam for forming a mark having a length shorter than a standard mark includes the single pulse, the single pulse having a width according to a width of the mark.

5. An optical information recording method according to claim 1, wherein a light beam for forming a mark having a length shorter than the standard mark has an intensity lower than the intensity of a part of the light beam for forming a mark having a length longer than the standard mark.

6. An optical information recording method according to claim 1, wherein a light beam for forming a mark having a length longer than a standard mark has different intensities in the head and the tail of the light beam.

7. An optical information recording method according to claim 1, wherein the light beam after finishing the irradiation of a light beam of a single pulse or a multi-pulse has an intensity lower than the intensity necessary for erasing the mark.

8. An optical information recording method according to claim 1, wherein the recording medium comprises a medium having a phase-change type recording medium, and the mark is formed by changing the recording film from the crystalline to the amorphous by the heat of the light beam.

9. An optical information recording method according to claim 1, wherein the light beam for forming a shortest mark of a nT length (n is the natural number, and T is the recording window width) includes a light pulse beam of a P1 intensity, and a light beam for forming a mark of a (n+1)T to (n+m)T (m>1, and m is the natural number) length includes a head light pulse beam of a P2 intensity (P1<P2) and subsequent light pulse beams of a P3 intensity (P1<P3).

10. An optical information recording method according to claim 9, wherein the light beam includes an off-pulse.

11. An optical information recording method according to claim 9, wherein the head light pulse beam for forming the (n+1) length mark includes a light pulse beam of a P4 (P1<P4, P4 ≠P2) intensity.

12. An optical information recording method according to claim 9, wherein the light beam for forming the (n+1)T to (n+m)T length mark has a bottom power between the pulse beams set at a value lower than a predetermined erasing power.

13. An optical information recording method according to claim 12, wherein the light beam includes an off-pulse.

14. An optical information recording method according to claim 12, wherein the light beam for forming a (n+1) length mark includes a light pulse beam of a P4 intensity (P1<P4, P4≠P2).

15. An optical information recording method comprising forming a mark on a recording medium by radiating a light beam on the recording medium in a form of a single pulse or a multi-pulse, the number of pulses of the multi-pulse being in accordance with a length of the mark, recorded information being represented by the positions of the starting end and the finishing end of the mark, wherein a pulse width of a single pulse or a head pulse of the multi-pulse is reduced by a value greater than a value corresponding to a difference between the length of a mark to be formed and the length of a standard mark, when the mark to be formed is shorter than the standard mark.

16. An optical information recording method according to claim 15, wherein a width of the single pulse is in accordance with a width of the mark.

17. An optical information recording method according to claim 16, wherein the light beam between the pulses of the multi-pulse has an intensity lower than the intensity necessary for erasing the mark.

18. An optical information recording method according to claim 15, wherein the light beam for forming a mark having a length shorter than the standard mark is a single pulse, the single pulse having a width according to a width of the mark.

19. An optical information recording method according to claim 15, wherein a light beam for forming a mark having a length shorter than the standard mark has an intensity lower than the intensity of a part of the light beam for forming a mark having a length longer than the standard mark.

20. An optical information recording method according to claim 15, wherein a light beam for forming a mark having a length longer than the standard mark has different intensities in the head and the tail of the light beam.

21. An optical information recording method according to claim 15, wherein the light beam after finishing the irradiation of a light beam of the single pulse or the multi-pulse has an intensity lower than the intensity necessary for erasing the mark.

22. An optical information recording method according to claim 15, wherein the recording medium comprises a medium having a phase-change type recording medium, and the mark is formed by changing the recording film from the crystalline to the amorphous by the heat of the light beam.

23. An optical information recording method according to claim 15, wherein the light beam for forming a shortest mark of a nT (n is the natural number, and T is the recording window width) is a single light pulse beam, the light beam for forming a (n+1)T to (n+m)T length mark comprises a head light pulse beam and subsequent light pulse beams, and the pulse width of the single light pulse beam having a width of the head light pulse beam shortened by shortening at least one of a front edge and a rear edge by predetermined amounts.

24. An optical information recording method according to claim 23, wherein the light beam for forming a nT length mark (n is the natural number, and T is the recording window width) includes a light pulse beam of a width having a P1 intensity, and the light beam for forming a (n+1) to (n+m)T length mark includes a head light pulse beam of a P1 intensity and subsequent light pulse beams of a P4 intensity of the amount larger than P1 by a predetermined amount Δ P.

25. An optical information recording method according to claim 23, wherein the light beam includes an off-pulse.

26. An optical information recording method according to claim 23, wherein the light beam for forming a (n+1)T to (n+m)T mark has the bottom power between the pulse beams set at a value lower than a predetermined erasing power.

27. An optical information recording method according to claim 15, wherein the light beam for forming a shortest mark of a nT (n is the natural number, and T is the recording window width) is a single light pulse beam, the light beam for forming a (n+1)T to (n+m)T length mark comprises a head light pulse beam and subsequent light pulse beam, and the pulse width of the single light pulse beam and a head light pulse beam for forming a mark having a length longer than the standard mark having a width of the head light pulse beam shortened by shortening at least one of a front edge and a rear edge by predetermined amounts.

28. An optical information recording method according to claim 27, wherein the light beam for forming a nT length mark (n is the natural number, and T is the recording window width) includes a light pulse beam of a width having a P1 intensity, and the light beam for forming a (n+1) to (n+m)T length mark includes a head light pulse beam of a P1 intensity and subsequent light pulse beams of a P4 intensity of the amount larger than P1 by a predetermined amount Δ P.

29. An optical information recording method according to claim 27, wherein the light beam includes an off-pulse for erasing the mark.

30. An optical information recording method according to claim 27, wherein the light beam for forming a (n+1)T to (n+m)T mark has the bottom power between the pulse beams set at a value lower than a predetermined erasing power.

31. An optical information recording method comprising forming a mark on a recording medium by radiating a light beam on the recording medium in a form of a single pulse or a multi-pulse, the number of pulses of the multi-pulse being in accordance with a length of the mark, recorded information being represented by the positions of a starting end and a finishing end of the mark, wherein an intensity of the single pulse or a head pulse of the multi-pulse is in accordance with the length of the mark; and a pulse width of the single pulse or a head pulse of the multi-pulse is reduced by a value greater than a value corresponding to a difference between the length of a mark to be formed and the length of a standard mark, when the mark to be formed is shorter than the standard mark.

32. An optical information recording method according to claim 31, wherein a width of the single pulse is in accordance with a width of the mark.

33. An optical information recording method according to claim 32, wherein the light beam between the pulses of the multi-pulse has an intensity lower than the intensity necessary for erasing the mark.

34. An optical information recording method according to claim 31, wherein the light beam for forming a mark having a length shorter than the standard mark is a single pulse, the single pulse having a width according to a width of the mark.

35. An optical information recording method according to claim 31, wherein a light beam for forming a mark having a length shorter than the standard mark has an intensity lower than the intensity of a part of the light beam for forming a mark having a length longer than the standard mark.

36. An optical information recording method according to claim 31, wherein a light beam for forming a mark having a length longer than the standard mark has different intensities in the head and the tail of the light beam.

37. An optical information recording method according to claim 31, wherein the light beam after finishing the irradiation of a light beam of the single pulse or the multi-pulse has an intensity lower than the intensity necessary for erasing the mark.

38. An optical information recording method according to claim 31, wherein the recording medium comprises a medium having a phase-change type recording medium, and the mark is formed by changing the recording film from the crystalline to the amorphous by the heat of the light beam.

39. An optical information recording method comprising:

forming mark on a recording medium by radiating a light beam on the recording medium as pulses and representing recorded information by the positions of a starting end and a finishing end of the mark; and changing the intensity of the light beam according to the length of the mark, wherein a pulse width of the light beam is reduced for a width value more than the decrement of the light pulse width corresponding to a difference between the length of a mark to be formed and the length of a standard mark, when the mark to be formed is shorter than the standard mark.

* * * * *